United States Patent
Salihbegovic (12)

(10) Patent No.: US 11,242,732 B2
(45) Date of Patent: Feb. 8, 2022

(54) GAS LIFT VALVE WITH DUAL FORTRESS SEAL

(71) Applicant: Zlatko Salihbegovic, New Iberia, LA (US)

(72) Inventor: Zlatko Salihbegovic, New Iberia, LA (US)

( * ) Notice: Subject to any disclaimer, the term of this patent is extended or adjusted under 35 U.S.C. 154(b) by 0 days.

(21) Appl. No.: 17/349,318

(22) Filed: Jun. 16, 2021

(65) Prior Publication Data

US 2021/0340848 A1 Nov. 4, 2021

(51) Int. Cl.
*F16K 31/126* (2006.01)
*F16K 41/10* (2006.01)
*E21B 43/12* (2006.01)

(52) U.S. Cl.
CPC .......... *E21B 43/123* (2013.01); *F16K 31/126* (2013.01); *F16K 41/10* (2013.01); *Y10T 137/2836* (2015.04); *Y10T 137/2934* (2015.04)

(58) Field of Classification Search
CPC ...... E21B 43/123; F16K 41/10; F16K 31/126; Y10T 137/2836; Y10T 137/2934
See application file for complete search history.

(56) References Cited

U.S. PATENT DOCUMENTS

| | | | | |
|---|---|---|---|---|
| 2,519,242 A * | 8/1950 | Garrett | ................. | E21B 43/123 137/155 |
| 2,761,465 A * | 9/1956 | Garrett | ................. | E21B 43/123 137/155 |
| 3,183,921 A * | 5/1965 | Garrett | ................. | E21B 43/123 137/155 |
| 3,225,783 A * | 12/1965 | Stacha | ................. | E21B 43/123 137/155 |
| 3,386,391 A * | 6/1968 | Garrett | ................. | E21B 43/123 417/54 |
| 4,151,857 A * | 5/1979 | DeMoss | ................. | E21B 43/123 137/155 |
| 2007/0227739 A1* | 10/2007 | Becker | ................. | E21B 43/123 166/319 |
| 2016/0145983 A1* | 5/2016 | Salihbegovic | ........ | E21B 43/123 137/12 |

* cited by examiner

*Primary Examiner* — George S Gray

(57) ABSTRACT

A GLV-gas lift valve that uses dual "Fortress™" seals on both sides of the bellow 19 to protect said bellow from both high dome pressure 3 acting against outside bellow surface and high injection pressure acting against bellow 19 internal surface. When valve is in closed position, after dome pressure 3 is applied, upper-dome side "Fortress™" seal is engaged and prevents high dome pressure reaching said bellow 19 external surface. When valve is in fully open position, when injection pressure 14 is applied, lower seal 10 is engaged and prevents access of high injection pressure into bellow acting against bellow internal surface. This principle allows much higher pressures to be applied in valve dome section and injection section by reducing differential pressure across the bellow 19. In addition, lower "Fortress™" seal allows very high injection pressure 14 more than 10 KSI to be applied without damage to bellow or gas lift valve components.

5 Claims, 3 Drawing Sheets

GAS LIFT VALVE WITH DUAL FORTRESS SEAL

CROSS-REFERENCE TO RELATED APPLICATIONS

None

STATEMENT REGARDING FEDERALLY SPONSORED RESEARCH OR DEVELOPMENT

This patent application is not federally sponsored.

THE NAMES OF THE PARTIES TO A JOINT RESEARCH AGREEMENT

None

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB

None

STATEMENT REGARDING PRIOR DISCLOSURES BY THE INVENTOR OR A JOINT INVENTOR

None

BACKGROUND OF THE INVENTION

(1) Field of the Invention

Oil and gas industry.

(2) Description of Related Art Including Information Disclosed Under 37 CFR 1.97 and 1.98

Not applicable

BRIEF SUMMARY OF THE INVENTION

A GLV-gas lift valve that uses dual "Fortress™" seals on both sides of the bellow to protect said bellow from high dome pressure externally and high injection pressure internally. When valve is in closed position, after dome pressure is applied, upper-dome side "Fortress™" seal is engaged and prevents high dome pressure reaching said bellow external surface. When valve is in fully open position, when injection pressure is applied, lower "Fortress™" seal is engaged and prevents access of high injection pressure into bellow acting against bellow internal surface. This principle allows much higher pressures to be applied in valve dome section and injection section.

BRIEF DESCRIPTION OF THE SEVERAL VIEWS OF THE DRAWING(S)

DETAILED DESCRIPTION OF THE INVENTION

Figure 1:
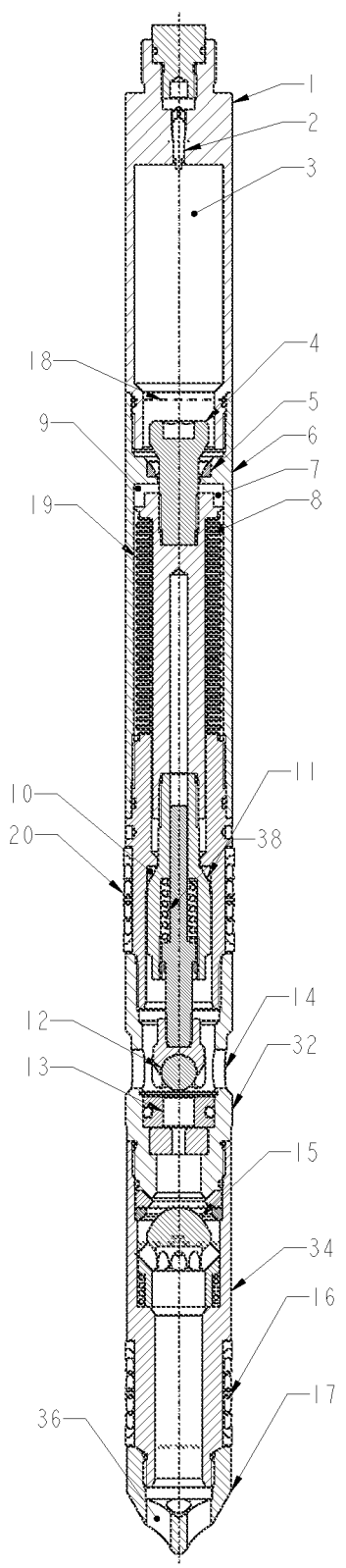
FIG. 1 shows gas lift valve with single formed bellow that features upper and lower "Fortress™" seals in closed position where only dome pressure is applied, upper "Fortress™" seal is engaged with no injection pressure applied.
Figure 2:
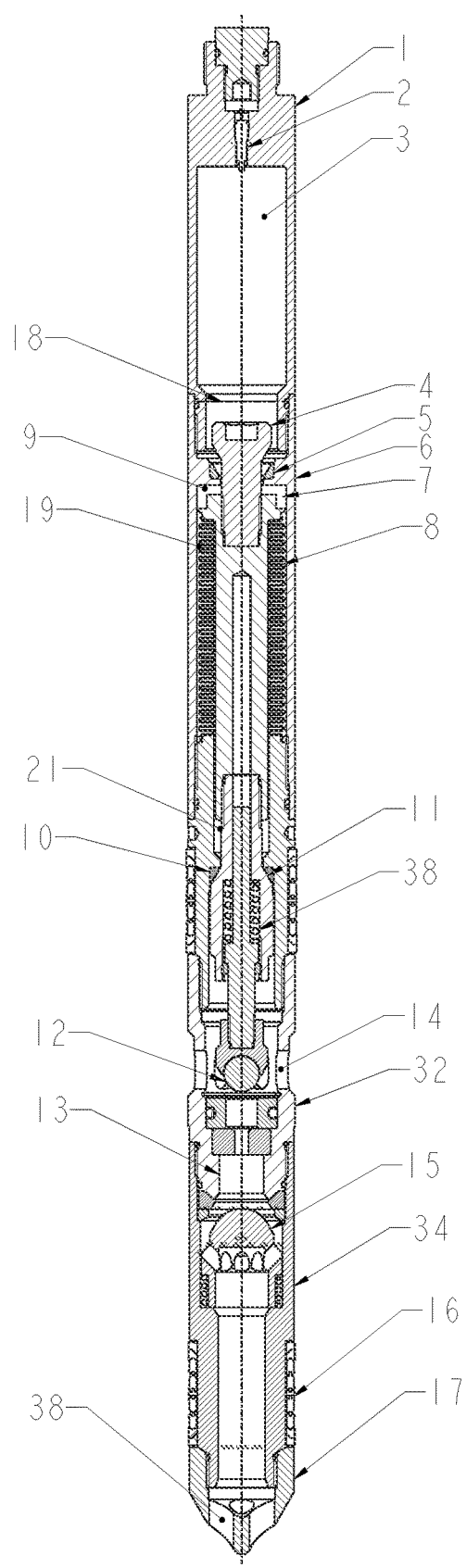
FIG. 2 shows said valve in fully open position where dome pressure and injection pressure are applied, and lower "Fortress™" seal is engaged.
Figure 3:
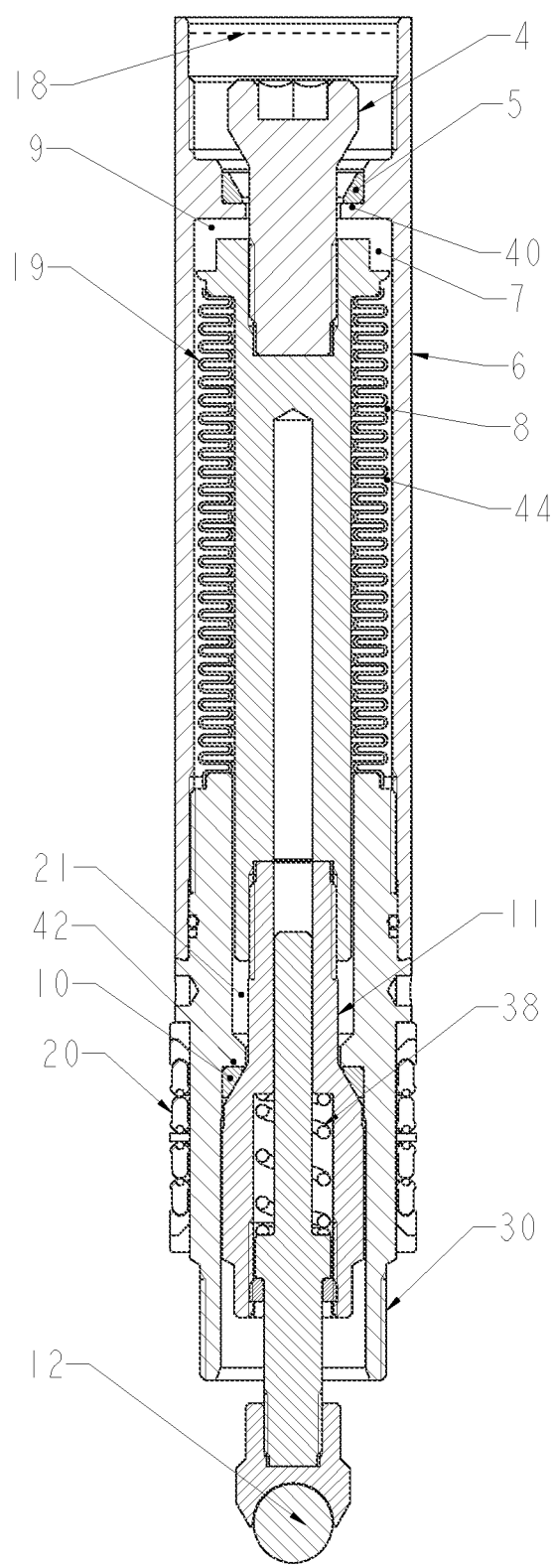
FIG. 3 shows detail of "Fortress™" seals arrangement with valve in fully open position with injection pressures applied and lower "Fortress™" seal engaged.
Figure 1:
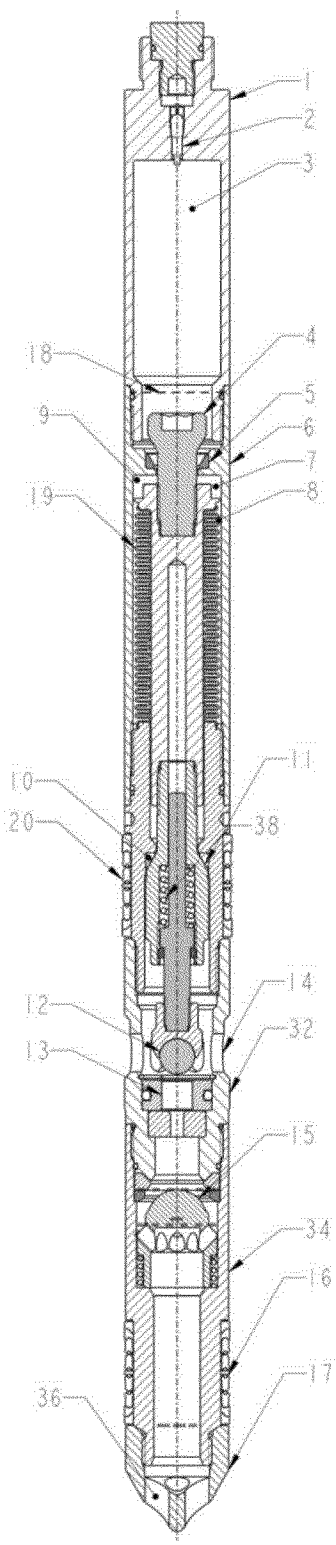
Figure 2:
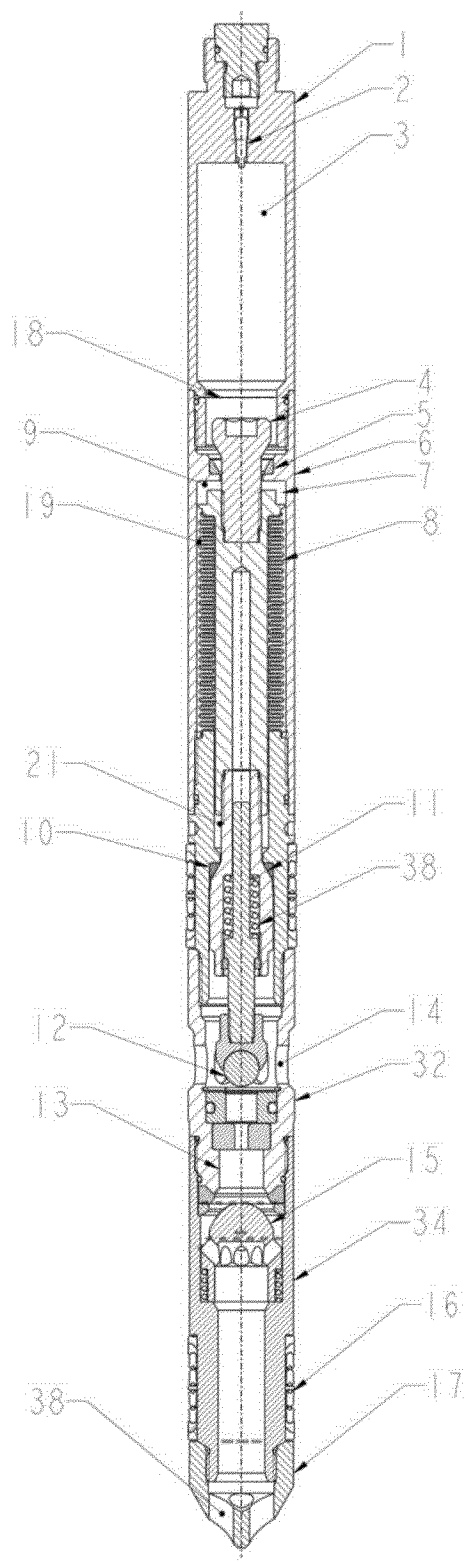
Figure 3:
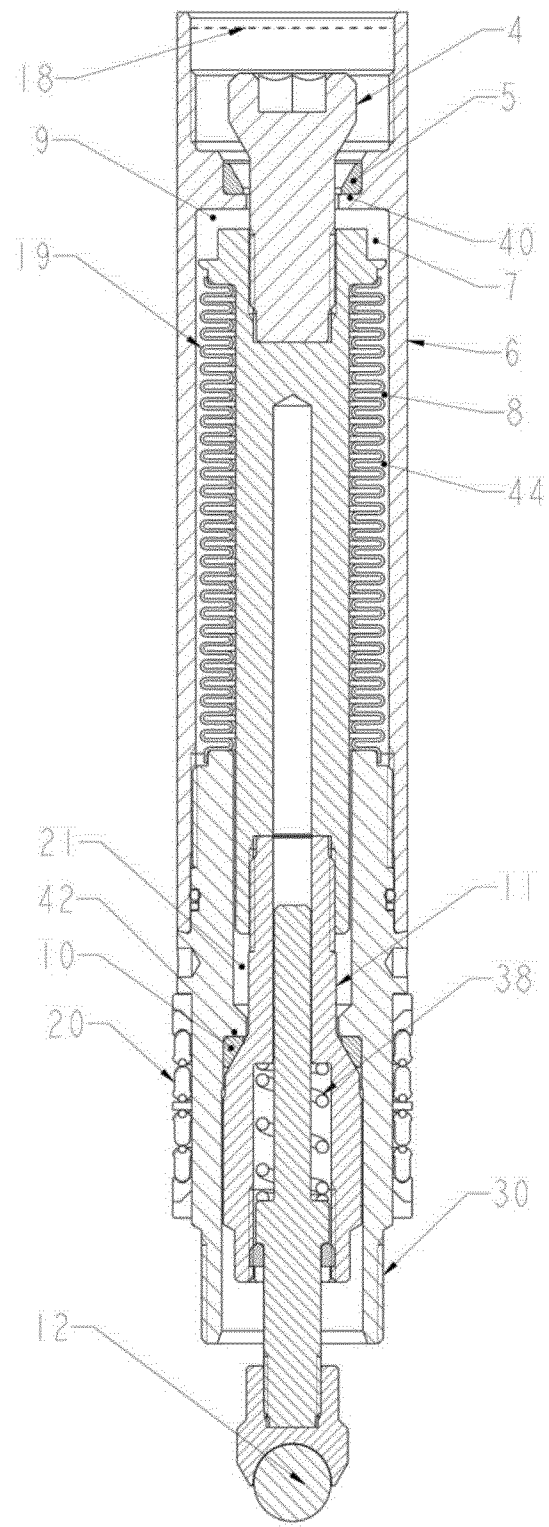

Gas lift valves are devices used in oil and gas industry to artificially lift oil from oil wells to the surface by injecting gas into oil formation and lift said oil to the surface where oil and gas are separated, and gas is re-used for repeated injection into oil formation. It is not intention of this patent application to explain gas lift technique. Persons skilled in the art requires no further explanation of gas lift techniques. Gas lift valves are using said bellows as a sliding seal between dome Nitrogen pressure 3 and injection pressure 14. Dome Nitrogen pressure 3 is pre-set to desired value which determines valve opening pressure when injection pressure is applied. Standard formed bellows 19 are not well suited for pressures higher than approximately 250 PSI. In gas lift valves bellows are exposed to pressures higher than 2000 PSI. For this reason, bellows needs to be protected from high injection 14 and dome pressure 3. One of technique used today to protect bellow from high injection pressure is so called "bellow hydraulic protection" where non-compressible silicone oil 18 is trapped in volume 7 and 8 when valve is fully open. In existing gas lift valve designs internal seal engages (not shown here) and traps non-compressible oil protecting bellow. This technique has erroneous assumption that silicone oil is non-compressible. Pressurized Nitrogen in valve dome section 3 is always in direct contact with silicone oil 18 that is filled into dome section 7 and 8 to level 18 and penetrates to oil rendering it compressible because it is mixture of oil and Nitrogen. Nitrogen is permanent gas and stays gaseous no matter how high the pressure is. This method used for decades in gas lift is simply wrong.

Expired U.S. Pat. No. 2,339,487 describes gas lift valve with external stem seal item #91, not shown here. "Fortress™" type seal 11 introduced herein is using this principle on injection side of the bellow. This lower "Fortress™" seal 10 engages by stem 11 when valve is fully open and protects bellow 19 from high injection pressure. However, it does not protect bellow 19 from high dome pressure 3. Most critical phase in gas lift valve TROP-test rack opening pressure setting procedure is when dome pressure 3 is applied. Bellow in standard gas lift valve with no upper "Fortress™" seal 5 is exposed to full dome pressure 3 since at this point injection pressure is atmospheric. Valve TROP-test rack opening pressure setting is performed in test rack device where dome Nitrogen pressure 3 is applied to dome 1 volume 3 through core valve 2. At this point complete dome pressure 3 acts against bellow 19 external surface, there is no injection pressure 14 that partially balances differential pressure across said bellow. Another critical phase of GLV processing is so called ageing procedure. This procedure is used to "stabilize bellow" by usually applying 1000 PSI dome pressure 3 and 5000 PSI injection pressure 14 with goal to perform bellow "final" crimping-shaping. Bellow is exposed to 4000 PSI differential pressure and assumption is that bellow hydraulic protection from high injection pressure works which is not the case as explained above. Exposed to 4000 PSI differential pressure bellow badly deforms. When injection pressure 14 is discharged from 5000 PSI to atmospheric pressure, bellow 19 is exposed to 1000 PSI dome pressure that partially deforms bellow in opposite direction since injection pressure is atmospheric.

Adding upper "fortress" seal 5 that engages when dome pressure 3 is applied at relatively low Nitrogen pressure that needs to compress bellow sufficiently to engage upper "fortress" seal 5 provides bellow 19 protection from high dome pressure 3. Bellow 19 is compressed to engage seal 5 at approximately 150 PSI since dome pressure 3 initially works only against relatively low bellow spring rate because at this point injection pressure 14 is atmospheric. Bellows 19 compresses and upper "Fortress™" seal 5 engages against upper stem 4. At this point only low pressure of approximately 150 PSI is trapped in volume 8 and 9 filled with silicone oil since engaged seal 5 is preventing high dome pressure 3 entering the bellow volume 8. Dome pressure now can be set to desired value that is much higher than pressure trapped in volume 8 and 9 but bellow will not be exposed to full dome pressure 3 and will be protected.

When injection pressure 14 is being applied to set valve TROP-test rack opening pressure/TRCP-test rack closing pressure, bellow starts to expand at pressure lower than full dome pressure 3 because upper fortress seal 5 has smaller diameter/surface area than bellow effective area. Trapped pressure in volume 8 outside bellow at this point is much lower than dome pressure 3. At certain injection pressure, lower than dome pressure 3, bellow 19 will expand and full dome pressure 3 would enter volume 8 temporarily closing the valve. Further injection pressure increase would expand bellow and pressure outside and inside bellow would equalize and valve will open. Bellow is now pressure balanced from inside out. Further injection pressure 14 increase would expand bellow and open the valve. Bellow 19 is now fully pressure balanced.

When TROP/TRCP is determined, injection pressure 14 needs to be decreased to atmospheric value. Full dome pressure is now trapped in volume 8 and 9 which is filled with silicone oil, upper fortress seal 5 is engaged against upper stem 4 and bellow is compressed. As injection pressure decreases, bellow 19 being thin wall membrane container will start to slightly shrink in volume. This would immediately result in slight volume 8/9 increase and immediate volume 8/9 pressure decrease because volume 8/9 is filled with fluid-silicone oil not gas. As injection pressure 14 is released to atmospheric bellow shrinkage will help to slightly increase volume 8/9 pressure close to zero PSI protecting bellow from deformation and damage.

In an exemplary embodiment, I have provided a gas lift valve for use in onshore and offshore oil wells for oil artificial lifting to the surface comprising of major parts as an external structure with longitudinal axis with dome 1, bellow housing 2 with upper packing stack-seal 20, inlet pressure 14 sub, internal port 13, lower packing-seal stack 16 body, nose 17 and internal moveable valve structure comprising of bellow 19 spring loaded telescoping stem 11 with TC-Tungsten carbide ball 12, and reverse flow check valve 15 the gas lift valve further comprising, an upper-dome 1 side "Fortress™" seal 5 and lower "Fortress™" seal 10, wherein dome pressure 3 acts against bellow 19 external surface and injection pressure 14 acts against bellow 19 internal surface.

In an exemplary embodiment the foregoing gas lift valve opens when injection pressure 14 acting inside bellow 19 generates force that exceeds dome pressure 3 acting outside bellow 19 generated force, closes when dome pressure 3 generated force is larger than injection pressure 14 generated force.

In an exemplary embodiment, the foregoing gas lift valve bellow 19 compresses and upper stem 4 engages upper-dome side "Fortress™" seal 5 when dome pressure 3 generated force is larger than injection pressure 14 generated force, thus preventing high dome pressure acting against bellow 19 external surface preventing bellow 19 damage, and telescoping stem 11 moves TC ball to contact port 13 and closes flow through the valve.

In an exemplary embodiment, the foregoing gas lift valve bellow 19 expands when injection pressure 14 generated force exceeds dome pressure 3 and bellow 19 expands lifting TC ball of the port 13 opening valve for flow, and when valve fully opens telescoping stem 11 engages lower "Fortress™" and prevents high injection pressure entering inside bellow 19, thus protecting it from high injection pressure 14.

In an exemplary embodiment, the foregoing gas lift valve very high injection pressure 14 of 10 KSI or higher, depending on materials used, can be applied for well integrity pressure testing without damaging bellow 19 by engaging lower "Fortress™" seal which prevents high injection pressure 14 higher than valve full open pressure from entering inside bellow 19, thus preventing high differential pressure across bellow, and prevents bellow 19 damage.

In an exemplary embodiment, I have provided a gas lift valve comprising: a dome 1, having a dome pressure 3; a bellow housing 6 coupled to the dome and having an upwardly facing seat 40; an upper packing seal stack 20 body 30 having an upper packing seal stack 20 and a downwardly facing seat 42; a liquid 44 filling the bellow housing 6 and partially filling the dome 1; an inlet pressure 14 sub 32 for allowing an injection pressure, the inlet pressure sub 32 being coupled to the upper packing-seal stack 20 body 30 and having an internal port 13; a lower packing-seal stack 16 body 34, the lower packing-seal stack 16 body having a lower packing-seal stack 16 and being coupled to the inlet pressure sub 32; a nose 17 coupled to the lower packing-seal stack body 34 and having ports 36; and an internal moveable valve structure partially positioned within the bellow housing, comprising: a bellow 19 positioned within the bellow housing 6 and having an external surface and an internal surface; a telescoping stem 11 loaded by a spring 38; an upper stem 4 coupled with the telescoping stem 11 and positioned for seating in the bellow seat 40; a ball 12 for seating on and closing the internal port 13; and a reverse flow check valve 15 positioned within the lower packing-seal stack body 34; the movable valve structure further comprising: an upper seal 5 positioned within the bellow housing 6 on the bellow housing seat 40 for receiving and sealing against the upper stem 4 when the upper stem is seated in the bellow seat 40; and a lower seal 10 positioned within the upper packing-seal body 30 seat 42 for receiving and sealing against the telescoping stem 11 when the telescoping stem is seated in the bellow seat 40; wherein the dome pressure 3 acts through the liquid 44 against the bellow 19 external surface and the injection pressure 14 acts against the bellow 19 internal surface, and further wherein, when the ball 12 is unseated, the injection pressure moves through the inlet pressure sub port 13, the check valve 15, and the nose ports 36.

In an exemplary embodiment, the gas lift valve opens when the injection pressure 14 acting inside the bellow 19 generates force that exceeds the dome pressure 3 generated force acting on the external surface of the bellow 19, and the gas lift valve closes when the dome pressure 3 generated force is larger than the injection pressure 14 generated force.

In an exemplary embodiment, the bellow 19 compresses and upper stem 4 seats in the bellow housing seat 40 thereby engaging the upper seal 5 when the dome pressure 3 generated force is larger than the injection pressure 14 generated force, thus reducing the dome pressure acting against the bellow 19 external surface by partitioning the liquid, thus isolating a liquid pressure below the upper seal 5 partition from the dome pressure 3 above the upper seal 5 partition, and telescoping stem 11 moves the ball 12 to contact the inlet pressure sub port 13 thus closing the inlet pressure sub port 13 to close flow through the inlet pressure sub port 13.

In an exemplary embodiment, the bellow 19 expands when injection pressure 14 generated force exceeds the dome pressure 3 generated force, the bellow 19 expansion lifting the ball 12 off of the inlet pressure sub port 13, thereby initiating the opening of the gas lift valve for flow through the check valve 15 and the nose ports 36, and when the gas lift valve fully opens the telescoping stem 11 then seats in the upper packing-seal stack seat 42, thereby engaging the lower seal 10, thus reducing the injection pressure 14 entering the bellow 19.

In an exemplary embodiment, the injection pressure 14 is 10 KSI.

The invention claimed is:

1. A gas lift valve comprising:
    a dome 1, having a dome pressure 3;
    a bellow housing 6 coupled to the dome and having an upwardly facing seat 40;
    an upper packing seal stack 20 body 30 having an upper packing seal stack 20 and a downwardly facing seat 42;
    a liquid 44 filling the bellow housing 6 and partially filling the dome 1;
    an inlet pressure 14 sub 32 for allowing an injection pressure, the inlet pressure sub 32 being coupled to the upper packing-seal stack 20 body 30 and having an internal port 13;
    a lower packing-seal stack 16 body 34, the lower packing-seal stack 16 body having a lower packing-seal stack 16 and being coupled to the inlet pressure sub 32;
    a nose 17 coupled to the lower packing-seal stack body 34 and having ports 36; and
    an internal moveable valve structure partially positioned within the bellow housing, comprising:
        a bellow 19 positioned within the bellow housing 6 and having an external surface and an internal surface;
        a telescoping stem 11 loaded by a spring 38;
        an upper stem 4 coupled with the telescoping stem 11 and positioned for seating in the bellow seat 40;
        a ball 12 for seating on and closing the internal port 13; and
        a reverse flow check valve 15 positioned within the lower packing-seal stack body 34;
    the movable valve structure further comprising:
        an upper seal 5 positioned within the bellow housing 6 on the bellow housing seat 40 for receiving and sealing against the upper stem 4 when the upper stem is seated in the bellow seat 40; and
        a lower seal 10 positioned within the upper packing-seal body 30 seat 42 for receiving and sealing against the telescoping stem 11 when the telescoping stem is seated in the bellow seat 40;
    wherein the dome pressure 3 acts through the liquid 44 against the bellow 19 external surface and the injection pressure 14 acts against the bellow 19 internal surface, and further wherein, when the ball 12 is unseated, the injection pressure moves through the inlet pressure sub port 13, the check valve 15, and the nose ports 36.

2. The gas lift valve of claim 1, wherein the gas lift valve opens when the injection pressure 14 acting inside the bellow 19 generates force that exceeds the dome pressure 3 generated force acting on the external surface of the bellow 19, and the gas lift valve closes when the dome pressure 3 generated force is larger than the injection pressure 14 generated force.

3. The gas lift valve of claim 1, wherein the bellow 19 compresses and upper stem 4 seats in the bellow housing seat 40 thereby engaging the upper seal 5 when the dome pressure 3 generated force is larger than the injection pressure 14 generated force, thus reducing the dome pressure acting against the bellow 19 external surface by partitioning the liquid, thus isolating a liquid pressure below the upper seal 5 partition from the dome pressure 3 above the upper seal 5 partition, and telescoping stem 11 moves 4G the ball 12 to contact the inlet pressure sub port 13 thus closing the inlet pressure sub port 13 to close flow through the inlet pressure sub port 13.

4. The gas lift valve of claim 1, wherein the bellow 19 expands when injection pressure 14 generated force exceeds the dome pressure 3 generated force, the bellow 19 expansion lifting the ball 12 off of the inlet pressure sub port 13, thereby initiating the opening of the gas lift valve for flow through the check valve 15 and the nose ports 36, and when the gas lift valve fully opens the telescoping stem 11 then seats in the upper packing-seal stack seat 42, thereby engaging the lower seal 10, thus reducing the injection pressure 14 entering the bellow 19.

5. The gas lift valve of claim 1, wherein the injection pressure 14 is 10 KSI.

* * * * *

UNITED STATES PATENT AND TRADEMARK OFFICE
CERTIFICATE OF CORRECTION

| | |
|---|---|
| PATENT NO. | : 11,242,732 B2 |
| APPLICATION NO. | : 17/349318 |
| DATED | : February 8, 2022 |
| INVENTOR(S) | : Zlatko Salihbegovic et al. |

It is certified that error appears in the above-identified patent and that said Letters Patent is hereby corrected as shown below:

In the Drawings

Replace Drawing Sheets 1-3 with attached Drawing Sheets 1-3, and on the Title Page, replace the illustrative print figure, Fig. 1, as shown on the attached Drawing Sheet 1 of 3.

Signed and Sealed this
Fourteenth Day of June, 2022

Katherine Kelly Vidal
*Director of the United States Patent and Trademark Office*